United States Patent
Alankry et al.

(10) Patent No.: US 8,458,364 B2
(45) Date of Patent: Jun. 4, 2013

(54) METHOD FOR RECEIVING AND PROCESSING FRAMES AND A DEVICE HAVING FRAME RECEIVING AND PROCESSING CAPABILITIES

(75) Inventors: Yaron Alankry, Ra'Anana (IL); Eran Glickman, Rehon Letzion (IL); Erez Parnes, Petka-Tivka (IL); Daniel Rozovsky, Tel Aviv (IL)

(73) Assignee: Freescale Semiconductor, Inc., Austin, TX (US)

( * ) Notice: Subject to any disclaimer, the term of this patent is extended or adjusted under 35 U.S.C. 154(b) by 878 days.

(21) Appl. No.: 12/375,795

(22) PCT Filed: Aug. 2, 2006

(86) PCT No.: PCT/IB2006/052650
§ 371 (c)(1),
(2), (4) Date: Jan. 30, 2009

(87) PCT Pub. No.: WO2008/015492
PCT Pub. Date: Feb. 7, 2008

(65) Prior Publication Data
US 2009/0310726 A1    Dec. 17, 2009

(51) Int. Cl.
*G06F 15/16* (2006.01)
*G04F 1/00* (2006.01)

(52) U.S. Cl.
USPC .......................................... 709/248; 702/178

(58) Field of Classification Search
USPC ............. 709/248; 702/178; 710/52; 714/718, 714/763
See application file for complete search history.

(56) References Cited

U.S. PATENT DOCUMENTS

| 4,709,347 | A * | 11/1987 | Kirk | 709/248 |
|---|---|---|---|---|
| 6,532,503 | B1* | 3/2003 | Lindeborg et al. | 710/52 |
| 6,751,573 | B1* | 6/2004 | Burch | 702/178 |
| 2002/0073228 | A1 | 6/2002 | Cognet et al. | |
| 2002/0078245 | A1* | 6/2002 | Norimatsu et al. | 709/248 |
| 2002/0163932 | A1* | 11/2002 | Fischer et al. | 370/465 |
| 2003/0012067 | A1 | 1/2003 | Wong et al. | |
| 2003/0033567 | A1* | 2/2003 | Tamura et al. | 714/718 |
| 2003/0137997 | A1* | 7/2003 | Keating | 370/519 |
| 2003/0214982 | A1 | 11/2003 | Lorek et al. | |
| 2005/0080952 | A1* | 4/2005 | Oner et al. | 710/52 |

FOREIGN PATENT DOCUMENTS

EP    1117045 B1    8/2007

OTHER PUBLICATIONS

How NICs Work (http://web.archive.org/web/20050112120257/http://www.ece.rice.edu/~willmann/teng_nics_hownicswork.html), dated Jan. 12, 2005.*
Garner, Geoffrey M.; "Description of Use of IEEE 1588 Followup Peer-to-Peer Transparent Clock in A/V Bridging Networks"; IEEE on-line: www.ieee802.org/1/files/public/docs2006/as-garner-use-of-p2p-tc-in-avb-0406.pdf; Mar. 27, 2006; pp. 1-23; IEEE.
PCT/IB2006/052650 International Search Report and Written Opinion.

* cited by examiner

*Primary Examiner* — Boris Gorney (57) ABSTRACT

A device having frame receiving and processing capabilities and a method for receiving and processing frames. The method includes: receiving a frame; associating a frame timestamp with the frame; storing the frame and the associated timestamp at a certain buffer out of a group of buffers; generating a valid timing information frame indicator if the received frame is a valid timing information frame; and storing the valid timing information frame indicator at a certain buffer descriptor associated with the certain buffer.

20 Claims, 5 Drawing Sheets

METHOD FOR RECEIVING AND PROCESSING FRAMES AND A DEVICE HAVING FRAME RECEIVING AND PROCESSING CAPABILITIES

FIELD OF THE INVENTION

The invention relates to methods for receiving and processing frames and a device having frame receiving and processing capabilities, especially in telecommunication integrated circuits.

BACKGROUND OF THE INVENTION

Figure 1:
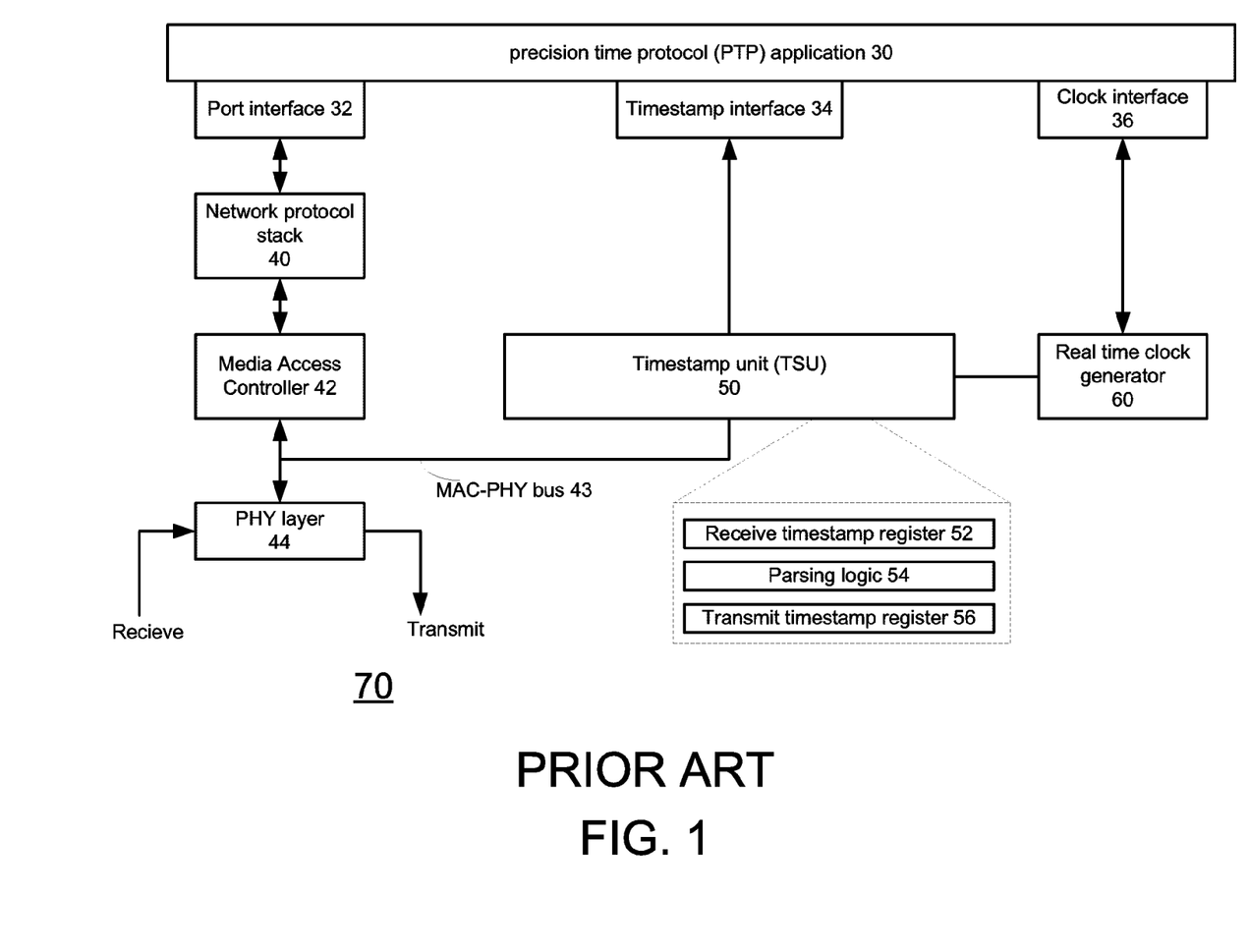
FIG. 1 illustrates a prior art device.
Figure 2:
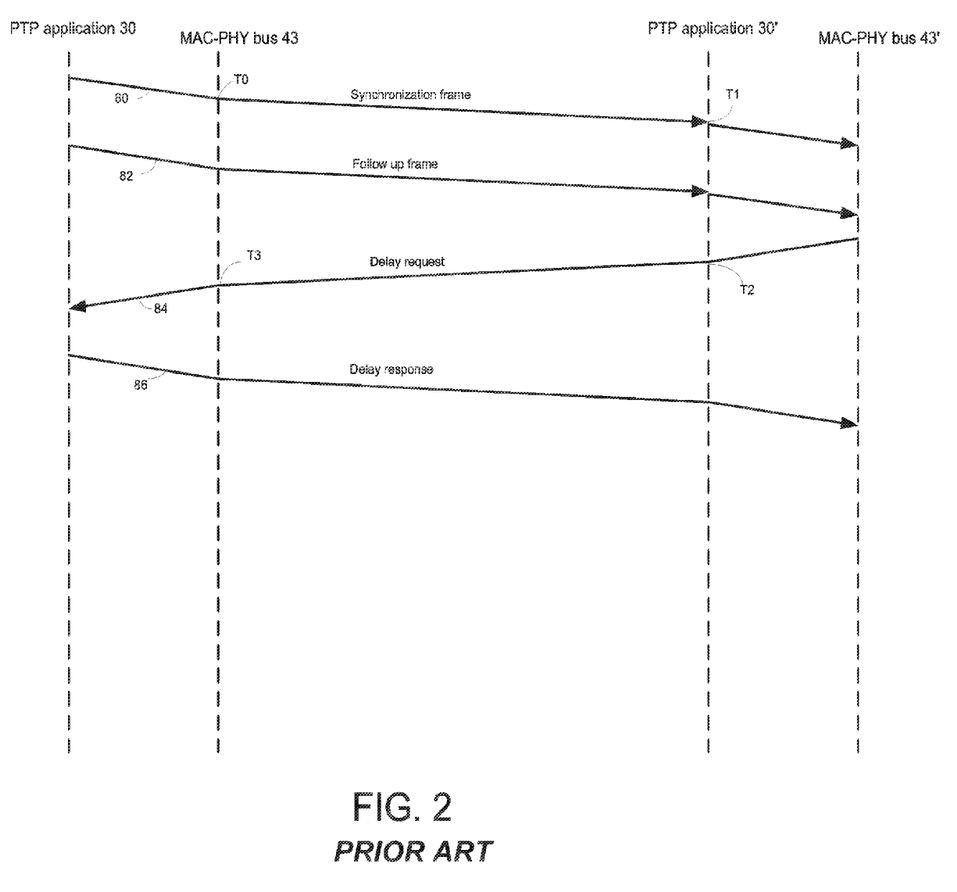
FIG. 2 illustrates a prior art synchronization sequence.

Distributed systems may require to synchronize between devices that are fed by different clock signals. IEEE standard 1588 is an example of a cost effective and high accuracy synchronization method. A typical 1588 IEEE compliant device is illustrated in FIG. 1 while a 1588 IEEE synchronization sequence is illustrated in FIG. 2.

Device 70 includes software and hardware components. The software components includes a precise time protocol (PTP) application 30 that can interface with various hardware components via port interface 32, timestamp interface 34 and clock interface.

Device 70 can receive and transmit information by using multiple protocol layer components such as network protocol stack 40, media access controller 42 and physical layer (PHY layer) 44. The network protocol stack can include TCP/IP/Ethernet compliant components.

A real time clock generator 60 generates a sequence of timestamps. These timestamps can be sent via clock interface 36 to PTP application and can also be sent to timestamp unit 50 that is capable of sampling these clock samples when it detects (the TSU sample the timestamp for all kind of frames at the start frame delimiter and use it only if the frame is considered as PTP frame which requires a timestamp) a timing information frame, and especially when it detects a start frame delimiter within a timing information frame. A typical timing information frame includes a preamble, a start of frame delimiter, a destination address, a source address, a frame type/length information, UDP header, PTP message (timing information) and a error correction field.

The timestamp unit 50 monitors a MAC layer-PHY layer interface such as MAC-PHY bus(e.g MII interface) 43 and when it detects that start frame delimiter passes over said bus it samples the timestamp that is provided by real time clock generator 60 and if the received frame is deemed to be a valid timing information frame then is sends an interrupt to a processor (not shown) that in turn extracts the timing information and can perform a synchronization sequence.

FIG. 2 illustrates a prior art synchronization sequence between a master device and a slave device. IEEE1588 also provides a mechanism that determines which device should be regarded as a master device that provides a master clock and which device is regarded as a slave device that provides a slave clock. The slave clock has to be adjusted according to the master clock.

The master device is illustrated by PTP application 30 and by MAC-PHY bus 43, while the slave device is illustrated by PTP application 30' and by MAC-PHY bus 43'.

The synchronization sequence starts includes an offset determination phase (illustrated by arrows 80 and 82) and a delay measurement phase (illustrated by arrows 84 and 86).

The offset measurement phase starts (as illustrated by arrow 80) by transmitting a synchronization frame that includes an estimated transmission time of that frame. The transmission occurs at T0 and the slave device receives the frame (at MAC-PHY interface 43') at exact point in time T1. Arrow 82 indicates that the master device then sends another frame ("follow up frame") that includes the exact transmission time (T0).

The slave device receives the follow up frame and can determine the offset between the slave clock and the master clock.

The delay measurement phase starts by (as illustrated by arrow 84) a transmission of a delay request frame from the slave device to the master device. This frame is transmitted from the slave device at point of time T2 and is received at the master device at point of time T3. The master device then transmits a delay response frame (illustrated by arrow 86) that includes point of time T3.

The difference between point of time T2 and T3 represent the propagation delay between the devices. This delay can be calculated by the slave device.

There is a need to provide efficient methods for receiving and processing frames and to provide efficient devices that have frame receiving and processing capabilities.

SUMMARY OF THE PRESENT INVENTION

A method for receiving and processing frames and a device having frame receiving and processing capabilities, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

The following figures illustrate exemplary embodiments of the invention. They are not intended to limit the scope of the invention but rather assist in understanding some of the embodiments of the invention. It is further noted that all the figures are out of scale.

According to an embodiment of the invention a method for receiving and processing frames is provided. The method includes: receiving a frame associating a frame timestamp with the frame; storing the frame and the associated timestamp at a certain buffer out of a group of buffers; generating a valid timing information frame indicator if the received frame is a valid timing information frame; and storing the valid timing information frame indicator at a certain buffer descriptors associated with the certain buffer.

Thus, a timestamp is associated with a received frame, regardless of it being a valid timing information frame or not. Instead of generating an interrupt request whenever a valid timing information frame is received the frames stored within the buffers can be processed according to a scheduling scheme that is not necessarily trigged by or responsive to interrupts.

According to an embodiment of the invention a device having frame receiving and processing capabilities is provided. The device includes: a real time clock generator; one or more timestamp units adapted to associate one or more frame timestamps with one or more received frames; one or more storage devices adapted to store the one or more frames and the one or more associated timestamps at certain buffers; and a processor adapted to generate a valid timing information frame indicator if a received frame is a valid timing information frame; wherein the device is further adapted to store the valid timing information frame indicator at a certain buffer descriptor associated with the certain buffer.

Figure 3:
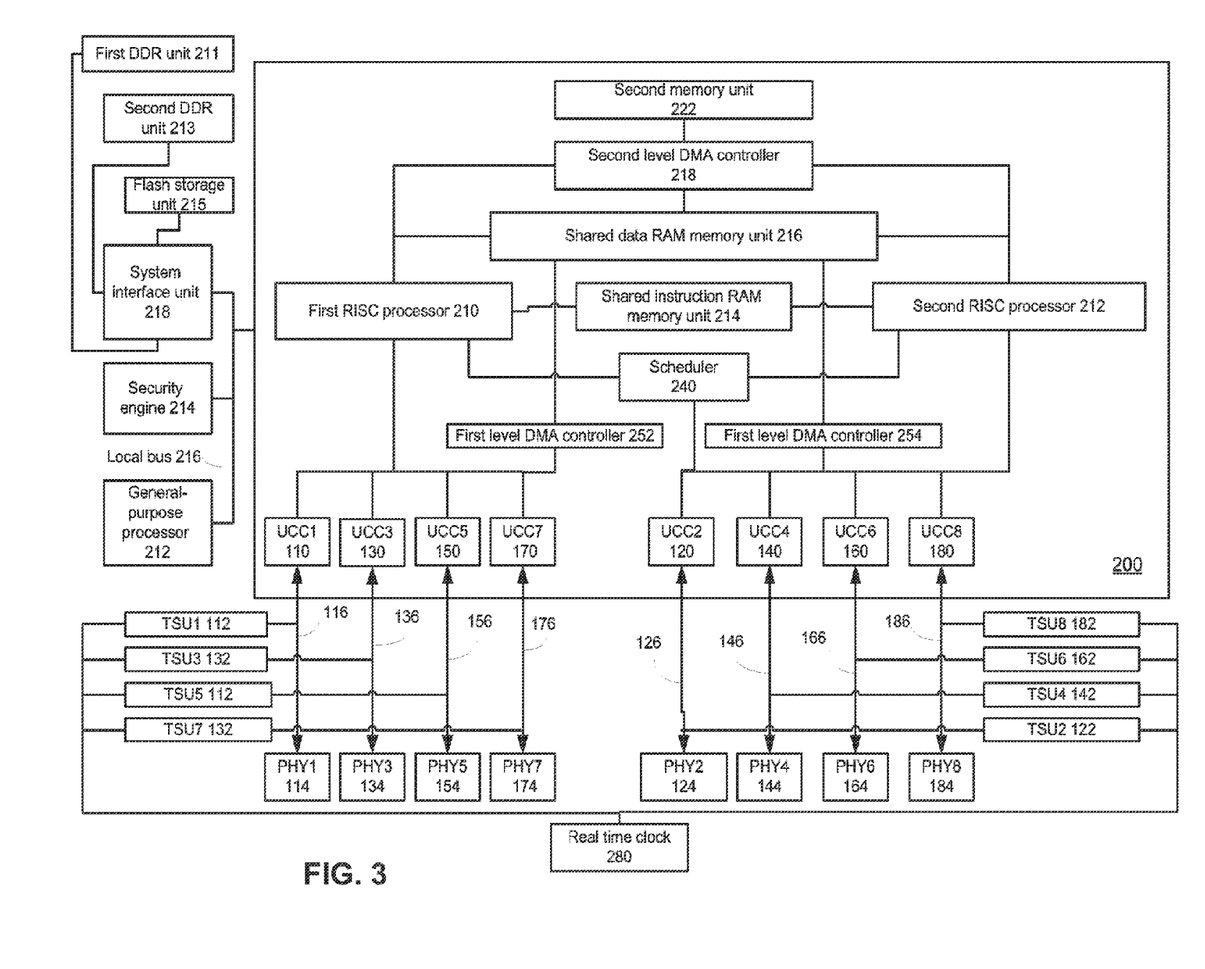
FIG. 3 illustrates a device according to an embodiment of the invention.

FIG. 3 illustrates a device 10, according to an embodiment of the invention.

Device 10 includes a general-purpose processor 212, a security engine 214, system interface unit 218, second memory unit 222, communication engine 200 and multiple ports (not shown). Components 212, 214, 218 and 200 are connected to each other by local bus 216.

The general-purpose processor 212 can include multiple execution units such as but not limited to an integer unit, a branch processing unit, a floating point unit, a load/store unit and a system register unit. It can also include various cache memories, dynamic power management unit, translation look aside buffers, and the like.

The general-purpose processor 212 can execute a precision time protocol (PTP) application such as PTP application 30. The PTP application 30 includes various software interfaces such as port interface 30, timestamp interface 34 and clock interface 36. These software interfaces are not illustrated for simplicity of explanation. In a nutshell, information is sent to buffers and buffer descriptors that are stored within a storage device out of second memory unit 222, first DDR storage unit 211, second DDR storage unit 213 and Flash memory unit 215. Interfaces 32-36 can be implemented by a code executed by general-purpose processor 212 that indicates where relevant information is stored.

The general-purpose processor 212 controls device 10 and can execute various programs according to the required functionality of device 10. The general-purpose processor 12 can be a member of the PowerPC™ family but this is not necessarily so.

The security engine 214 can apply various security mechanisms including encryption based mechanisms and the like.

Device 10 can be connected to multiple memory units (such as first DDR storage unit 211, second DDR storage unit 312 and Flash memory unit 215), as well as other components. These components are interfaced by system interface unit 218. System interface unit 218 may include some of the following components: external memory controllers, external DDR interface unit, PCI bridge, local bus, bus arbitrator, dual UART unit, dual I²C unit, a four channel DMA controller, an interrupt controller, and the like. It is noted that other interfacing components can be used.

Communication engine 200 is a versatile communication component that can manage multiple communication ports that operate according to different communication protocols. Communication engine 200 includes multiple communication controllers of different types. Each communication controller can manage one or more communication channels. Conveniently, each communication channel is associated with a single virtual buffer. A bi-directional communication channel is viewed as a combination of a receive communication channel and a transmit communication channel. Each such communication channel can have its own information transfer controller, virtual buffers, hardware Buffer, and the like.

It is noted that one or more communication channels can be controlled by a single information transfer controller, but this is not necessarily so.

The communication engine 200 includes two RISC processors 210 and 212, second level DMA controller 216, a shared data RAM memory unit 216, a shared instruction RAM memory unit 214, scheduler 240, two first level DMA controllers 252 and 254, a second memory unit 222, eight universal communication controllers denoted UCC1-UCC8 110-180. It is noted that additional components, such as but not limited to various ports, time slots assigners and the like were omitted for simplicity of explanation.

The first RISC processor 210 is connected to UCC1 110, UCC3 130, UCC5 150 and UCC7 170, scheduler 240, shared instruction RAM memory unit 214 and shared data RAM memory unit 216. The access to the first RISC controller can be managed by scheduler 240.

The second RISC processor 212 is connected to UCC2 120, UCC4 140, UCC6 160, UCC8 180, scheduler 240, shared instruction RAM memory unit 214 and shared data RAM memory unit 216. The access to the second RISC controller can be managed by scheduler 240.

The first level DMA controllers 252 and 254 are connected to the shared data RAM memory unit 216 and to information transfer controllers (not shown) within the various communication controllers.

Each communication controller out of communication controllers UCC1-UCC8 110-180 can include transmission paths as well as reception paths.

Conveniently, a UCC can support the following communication protocols and interfaces (not all simultaneously): 10/100 Mbps Ethernet, 1000 Mpbs Ethernet, IPv4 and IPv6, L2 Ethernet switching using, ATM protocol via UTOPIA interface, various types of HDLC, UART, and BISYNC.

In addition, the communication engine 200 can include a controller (not shown) as well as an interrupt unit that coordinate the various components of the communication engine, as well as to enable the communication engine 200 to communicate with general-purpose processor 212, security engine 214 and system interface unit 216.

Conveniently, a group of communication controllers are connected to a single first level DMA controller, but this is not necessarily so. For example, first level DMA controller 252 serves communication controllers UCC1, UCC3, UCC5, UCC7, 110, 130, 150 and 170 respectively, while first level DMA controller 254 serves communication controllers UCC2, UCC4, UCC6, UCC8 120, 140, 160 and 180 respectively.

Each communication controller out of UCC1-UCC8 110-180 includes a MAC layer component as well as higher layer components such as but not limited to media access controller 42 and network protocol stack 40 of FIG. 1.

First communication controller UCC1 is connected to first PHY layer component PHY1 114 via first MAC-PHY bus 116. A first timestamp unit (TSU1) is connected to first MAC-PHY bus 116. Second communication controller UCC2 is connected to second PHY layer component PHY2 124 via second MAC-PHY bus 126. A second timestamp unit (TSU2) is connected to second MAC-PHY bus 126. Third communication controller UCC3 is connected to third PHY layer component PHY3 134 via third MAC-PHY bus 136. A third timestamp unit (TSU3) is connected to third MAC-PHY bus 136. Fourth communication controller UCC4 is connected to fourth PHY layer component PHY4 144 via fourth MAC-PHY bus 146. A fourth timestamp unit (TSU4) is connected to fourth MAC-PHY bus 146. Fifth communication controller UCC5 is connected to fifth PHY layer component PHY5

154 via fifth MAC-PHY bus 156. A fifth timestamp unit (TSU5) is connected to fifth MAC-PHY bus 156. Sixth communication controller UCC6 is connected to sixth PHY layer component PHY6 164 via sixth MAC-PHY bus 166. A sixth timestamp unit (TSU6) is connected to sixth MAC-PHY bus 166.

Seventh communication controller UCC7 is connected to seventh PHY layer component PHY7 174 via seventh MAC-PHY bus 176. A seventh timestamp unit (TSU7) is connected to seventh MAC-PHY bus 176. Eighth communication controller UCC8 is connected to eighth PHY layer component PHY8 184 via eighth MAC-PHY bus 186. An eighth timestamp unit (TSU8) is connected to eighth MAC-PHY bus 186.

First till eighth timestamp units TSU1-TSU8 112-182 are connected to real time clock generator 280 for receiving timestamps. The reception can be done in a continuous manner but this is not necessarily so.

Once a frame is sent over a MAC-PHY bus, and when a timestamp unit detects a start frame delimiter the timestamp unit saves the timestamp it currently receives from the real time clock generator and this timestamp is regarded as that frame timestamp.

Device 10 can act as a slave device or a master device. When it acts as a slave device it has to synchronize to a clock that belongs to another device. If it acts as a master device other device should synchronize to the clock provided by its real time clock generator 280.

Device 10 and especially general-purpose processor 212 can synchronize between clocks of different devices by executing a PTP application.

Device 10 is also capable of transmitting frames of various types. The transmission does not require to attach a timestamp to each frame, only to valid timing information frames. Valid timing information frames can be stored in transmit buffers, while these buffers are associated with transmit buffer descriptors that store valid timing information indicators is the associated buffers store valid timing information frames.

Figure 4:
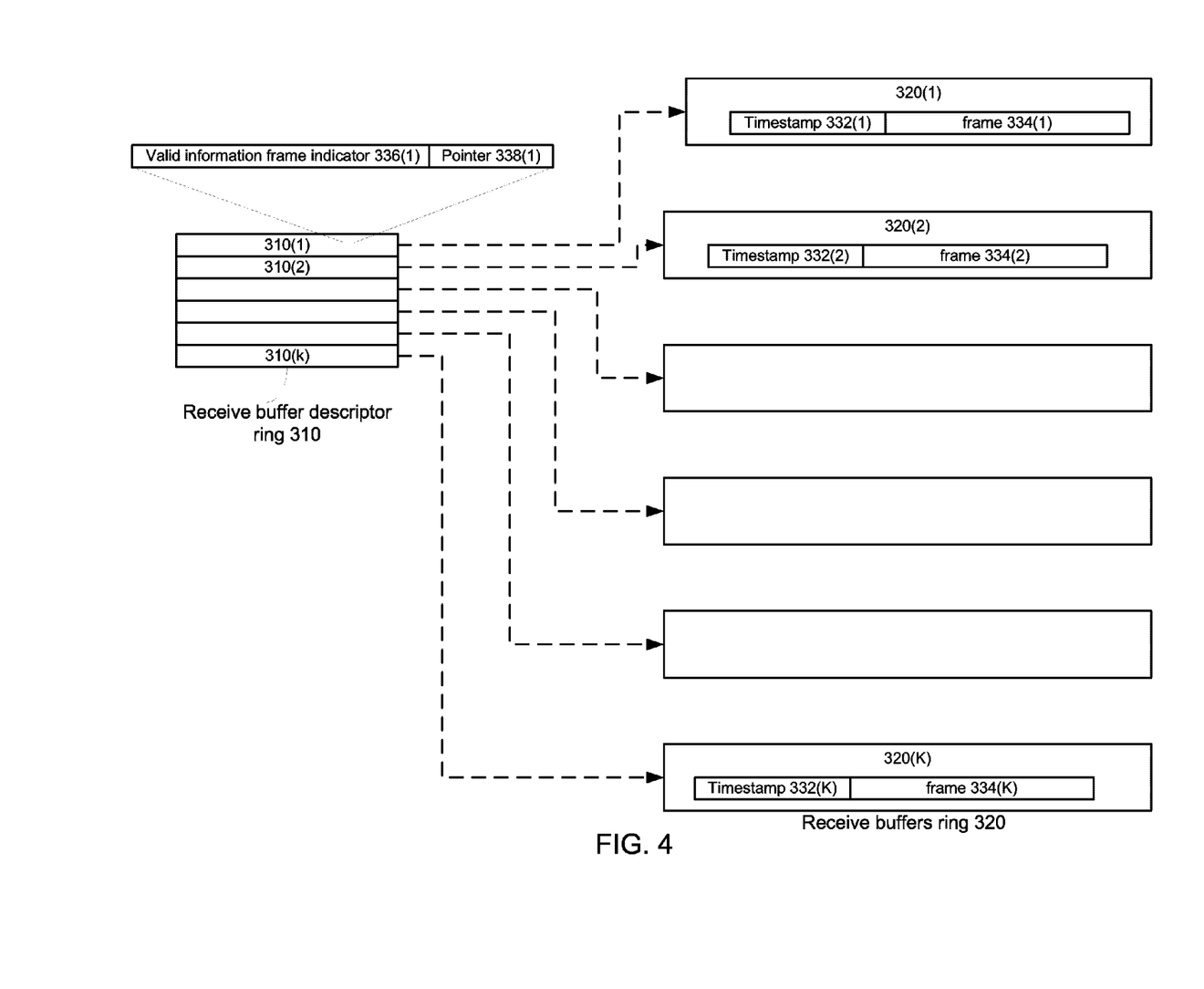
FIG. 4 illustrates a receive buffer descriptor ring and a group of receive buffers 320 according to an embodiment of the invention.

FIG. 4 illustrates receive buffer descriptor ring 310 and group of receive buffers 320 according to an embodiment of the invention.

Receive buffer descriptor ring 310 and group of receive buffers 320 can be stored in different types of storage devices accessible by general-purpose processor 212.

It is noted that a frame can be stored in one or more buffer descriptors. It is also noted that device 10 can maintain multiple buffer descriptor rings, maintain both receive and transmit buffers and buffer descriptors and the like.

For convenience of explanation it is assumed that there are K buffer descriptors and that there are k corresponding buffers. Index K is a positive integer.

The K buffer descriptors include buffer descriptors 310(1)-310(k), while the K buffers include buffers 320(1)-320(k).

The k'th buffer descriptor (k ranging between 1 and K) points to the k'th buffer, as illustrated by pointer 338(1) stored within first buffer descriptor 310(1). Each buffer out of buffers 320(1)-320(K) can store a frame (or a frame portion) and an associated timestamp, as indicated by frames 330(1), 330(2), 330(K) and timestamps 332(1), 332(2) and 332(K) stored within buffers 320(1), 320(2) and 320(K).

Assuming that first buffer 320(1) stores a valid timing information frame while other buffers do not store a valid timing information frame, then first buffer descriptor 310(1) stores a valid timing information indicator 336(1), while other buffer descriptors do not store such an indicator.

Figure 5:
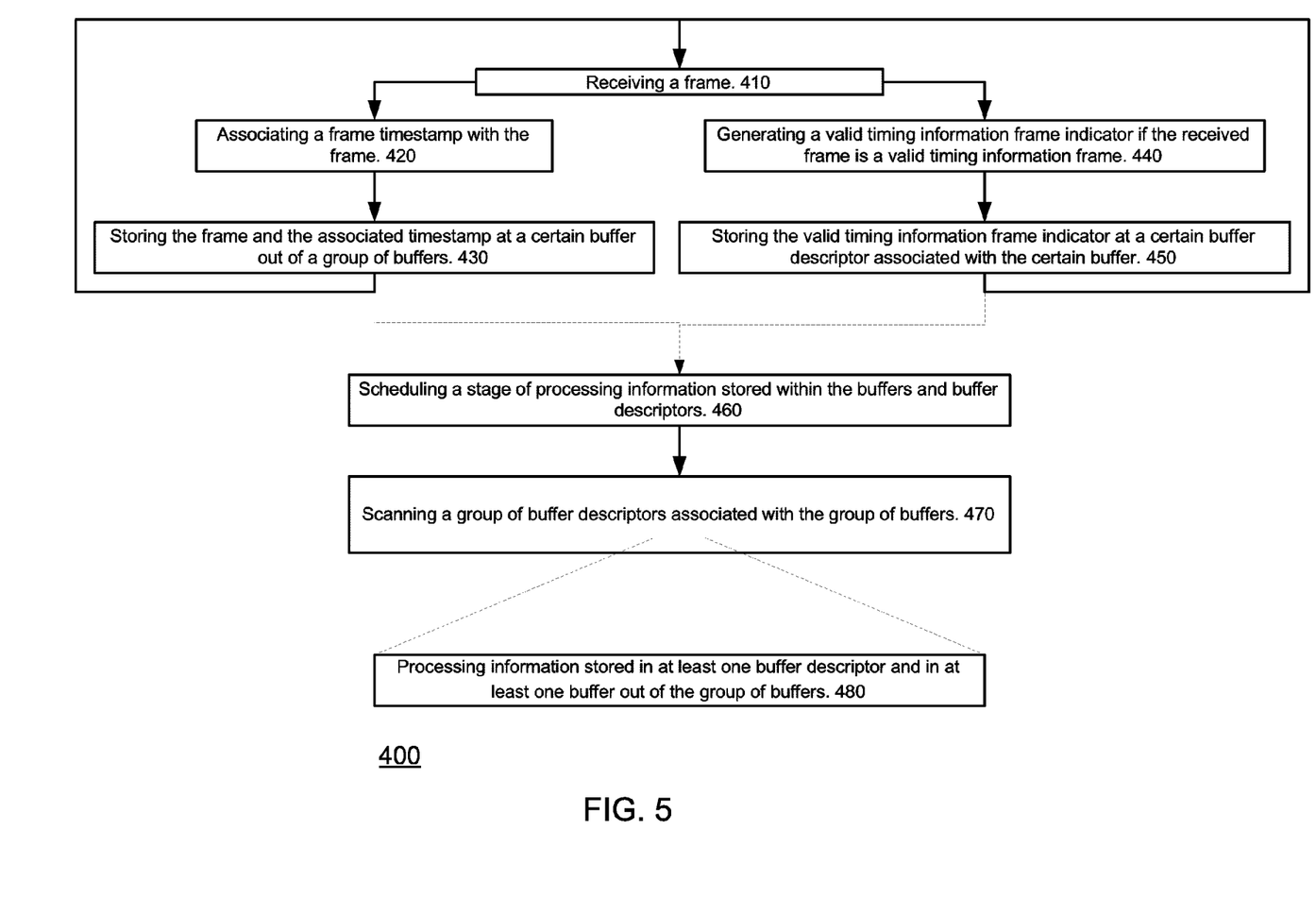
FIG. 5 is a flow chart of a method for receiving and processing frames, according to an embodiment of the invention.

FIG. 5 illustrates a flow chart of method 400 for receiving and processing frames, according to an embodiment of the invention.

Method 400 starts by stage 410 of receiving a frame. Referring to the example set forth in FIG. 3, a frame can be received by a PHY layer component such as either one of PHY1-PHY8 114-184 and then sent over MAC-PHY buses 116-186 to a corresponding MAC layer component within UCC1-UCC8 110-180.

Stage 410 is followed by stages 420 and 440.

Stage 420 includes associating a frame timestamp with the frame. Conveniently the time stamp is associated once the frame passes through a PHY-MAC interface. Conveniently, stage 420 includes retrieving a timestamp generated by a real time clock generator when a predefined portion of the frame is detected by a hardware parser.

Referring to the example set forth in FIG. 3, a timestamp unit such as TSU1-TSU8 112-182 can constantly receive timestamps from real time clock generator 280 and once it detects that a frame propagates over a bus out of MAC-PHY buses 116-186, and especially when the timestamp unit detects that a start of frame delimited passes over said MAC PHY bus, it stores (samples) the timestamp from real time clock generator 280 and this timestamp is then referred to as the timestamp of the received frame.

Stage 420 is followed by stage 430 of storing the frame and the associated timestamp at a certain buffer out of a group of buffers. Conveniently, a receiver includes one or more receiver groups of buffers. Each group of buffers is usually arranged as a cyclic ring of buffers where information is stored according to its arrival order.

Referring to the example set forth in FIG. 3 and in FIG. 4 and assuming that the frame is frame 334(1,2) and the timestamp is timestamp 332(1,1) then they are sent to a buffer 320(1) that is associated with buffer descriptor 310(1).

It is noted that the frame and associated timestamp are received at a MAC component within a communication controller out of UCC1-UCC8 110-180, and then they can be sent, via first or second DMA controllers 252 and 254 to shared data RAM memory unit 216 and via second level DMA controller 218 to second memory unit 222.

Stage 440 includes generating a valid timing information frame indicator if the received frame is a valid timing information frame.

Referring to the example set forth in FIG. 3 and in FIG. 4 and assuming that the frame is frame 332(1,2) and the timestamp is timestamp 334(1,1) then a valid timing information indicator 336(1,1) is stored at buffer descriptor 310(1). This buffer descriptor also stored additional information such as but not limited to a pointer 338(1,2) to buffer 320(1).

Stage 440 is followed by stage 450 of storing the valid timing information frame indicator at a certain buffer descriptor associated with the certain buffer.

Referring to the example set froth in FIG. 3 and in FIG. 4 and assuming that the frame is frame 330(1,2) and the timestamp is timestamp 330(1,1) then a valid timing information indicator 340(1,1) is stored at buffer descriptor 310(1). This buffer descriptor also stored additional information such as but not limited to a pointer 340(1,2) to buffer 320(1).

Stages 410-450 are repeated to provide a first process. A second process can include stages 460-480. While the first process involve storing information (frame, timestamp, valid timing information frame indicator and additional metadata stored in the buffer descriptors).

Stage 460 includes scheduling a stage of processing information stored within the buffers and buffer descriptors. This scheduling is not based upon a reception of interrupts. In other words, the method does not generate an interrupt whenever a valid timing information frame is received, thus relaxing interrupt latency requirements. Accordingly, the processing is made in a more relaxed manner and is not necessarily triggered by an interrupt per reception of a valid timing information frame.

It is noted that the maintenance of the buffers and buffer descriptors can use interrupts but they are less frequent. For example an interrupt can be generated when the buffers were not accessed for a predefine period, when all the buffers are full, and the like.

Stage 460 is followed by stage 470 of scanning a group of buffer descriptors associated with the group of buffers. Accordingly, the information stored in the buffers and buffer descriptor is processed, one buffer and buffer descriptor at a time, in a cyclic manner. It is noted that the scanning can be executed in a continuous manner, according to a predefined scheduling scheme, during predefined spaced apart time intervals a nd the like. Conveniently, the scheduling of stage 460 determines when each buffer will be accessed and processed.

Stage 470 includes one or more repetitions of stage 480 of processing information stored in at least one buffer descriptor and in at least one buffer out of the group of buffers.

Conveniently, stage 480 includes processing a frame according to a programmable frame processing code. The frame can be stored in a buffer and can be processed according to a programmable frame processing code that can differ from the hardwired processing done by the timestamp units. The frame programmable code can be altered to meet updated processing requirements.

Conveniently, stage 480 includes ignoring timestamps associated with frames that differ from valid timing information frames.

According to an embodiment of the invention the mentioned above stages can be applied when multiple PHY-MAC interfaces (or busses) exist. Thus, frame received from different MAC-PHY buses can be stored at the same group of buffers. Accordingly, stage 410 includes receiving multiple frames. Stage 420 includes associating a frame timestamp with each of the multiple frames. Stage 430 includes storing the multiple frames and the associated timestamps at a group of buffers. Stage 440 includes generating at least one valid timing information frame indicator if at least the multiple frame is a valid timing information frame. Stage 450 includes storing one or more valid timing information frame indicator at one or more buffer descriptors associated with the one or more buffer that stores the at least one valid timing information frame.

Referring to the example set forth in FIG. 3, multiple frames can be received either substantially simultaneously or not over multiple MAC PHY buses 116-186 and be stored at the same group of buffers (for example stored within receive buffers ring 320).

Conveniently, multiple stages of method 400 are repeated in order to synchronize at least two clocks. The synchronization process can include exchanging various timing information frames (for example synchronization frame, follow up frame, delay request frame and delay response frame) and processing the timing information included within these frames.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:
1. A method for receiving and processing frames, the method comprises:
   receiving a frame;
   associating a frame timestamp with the frame;
   storing the frame and the associated timestamp at a certain buffer out of a group of buffers;
   generating a valid timing information frame indicator if the received frame is a valid timing information frame;
   storing the valid timing information frame indicator at a certain buffer descriptor associated with the certain buffer; and
   processing timing information within the frame to synchronize at least two clocks in response to the valid timing information frame indicator being valid and in response to the certain buffer, containing the frame, not being accessed for a predefined period.

2. The method according to claim 1 further comprising processing information stored in at least one buffer descriptor.

3. The method according to claim 2 wherein the processing is preceded by scanning a group of buffer descriptors associated with the group of buffers.

4. The method according to claim 2 wherein the processing comprises processing the frame according to a programmable frame processing code.

5. The method according to claim 2 wherein the processing comprises ignoring timestamps associated with frames that differ from valid timing information frames.

6. The method according to claim 2 wherein the processing is preceded by scheduling the processing to initiate without a reception of an interrupt from a timestamp unit.

7. The method according to claim 1 wherein the associating comprises retrieving a timestamp generated by a real time clock generator when a predefined portion of the frame is detected by a hardware parser.

8. The method according to claim 1 wherein the method comprises:
   receiving multiple frames;
   associating a frame timestamp with each of the multiple frames;
   storing the multiple frames and the associated timestamps at a group of buffers;
   generating at least one valid timing information frame indicator if at least one of the multiple frames is a valid timing information frame; and
   storing the at least one valid timing information frame indicator at least one buffer descriptor associated with at least one buffer that stores the at least one valid timing information frame, wherein the timing information within the frame is processed in response to the group of buffers, containing the multiple frames, not being accessed for the predefined period of time.

9. The method according to claim 2 wherein the method comprises synchronizing at least two clocks in response to valid timing information stored in the certain buffer.

10. The method according to claim 2 wherein the associating comprises retrieving a timestamp generated by a real time clock generator when a predefined portion of the frame is detected by a hardware parser.

11. A device having frame receiving and processing capabilities, the device comprises:
   a real time clock generator;
   a timestamp unit adapted to associate a frame timestamp with a received frame;

at least one storage device adapted to store the frame and the associated timestamp at a certain buffer out of a group of buffers; and a processor adapted to generate a valid timing information frame indicator if the received frame is a valid timing information frame, and to process timing information within the received frame to synchronize at least two clocks in response to the valid timing information frame indicator being valid and in response to the certain buffer, containing the frame, not being accessed for a predefined period;

wherein the device is further adapted to store the valid timing information frame indicator at a certain buffer descriptor associated with the certain buffer.

12. The device according to claim 11 wherein the processor is adapted to process information stored in at least one buffer descriptor.

13. The device according to claim 11 wherein the processor is adapted to scan a group of buffer descriptors associated with the group of buffers.

14. The device according to claim 11 wherein the processor is adapted to process a frame according to a programmable frame processing code.

15. The device according to claim 11 wherein the processor is adapted to ignore timestamps associated with frames that differ from valid timing information frames.

16. The device according to claim 11 wherein the processor is adapted to schedule a processing of buffers such as to initiate without a reception of an interrupt from a timestamp unit.

17. The device according to claim 11 wherein the timestamp unit is adapted to retrieve a timestamp generated by a real time clock generator when a predefined portion of the frame is detected by a hardware parser.

18. The device according to claim 11 wherein the device is adapted to receive multiple frames, associate a frame timestamp with each of the multiple frames; store the multiple frames and the associated timestamps at the group of buffers; generate at least one valid timing information frame indicator if at least one of the multiple frames is a valid timing information frame and store the at least one valid timing information frame indicator at least one buffer descriptor associated with at least one buffer that stores the at least one valid timing information frame, wherein the timing information within the received frame is processed in response to the group of buffers, containing the multiple frames, not being accessed for the predefined period of time.

19. A method for receiving and processing frames, the method comprises:

receiving multiple frames;

associating a frame timestamp with each of the multiple frames;

storing the multiple frames and the associated timestamps at a group of buffers;

generating at least one valid timing information frame indicator if at least one of the multiple frames is a valid timing information frame;

storing the at least one valid timing information frame indicator at least one buffer descriptor associated with at least one buffer that stores the at least one valid timing information frame; and processing timing information within a first frame of the multiple frames to synchronize at least two clocks in response to one of the at least one valid timing information frame indicator associated with the first frame being valid and in response to the group of buffers, containing the multiple frames, not being accessed for a predefined period.

20. The method of claim 19 further comprising:

generating an interrupt in response to the group of buffers not being accessed for a predefined period.

* * * * *

UNITED STATES PATENT AND TRADEMARK OFFICE
CERTIFICATE OF CORRECTION

PATENT NO.       : 8,458,364 B2
APPLICATION NO.  : 12/375795
DATED            : June 4, 2013
INVENTOR(S)      : Alankry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1002 days.

Signed and Sealed this
Twenty-seventh Day of January, 2015

Michelle K. Lee
*Deputy Director of the United States Patent and Trademark Office*